United States Patent [19]

Rich

[11] 4,179,132
[45] Dec. 18, 1979

[54] MULTI-PURPOSE HAND TRUCK

[76] Inventor: Robert L. Rich, 13371 Lucille St., Garden Grove, Calif. 92641

[21] Appl. No.: 864,465

[22] Filed: Dec. 27, 1977

[51] Int. Cl.² ............................................... B62B 1/14
[52] U.S. Cl. .................................. 280/47.26; 248/98; 280/47.27
[58] Field of Search ............... 280/47.28, 47.29, 47.18, 280/47.19, 47.24, 47.26, 47.27; 248/97, 98, 99

[56] References Cited

U.S. PATENT DOCUMENTS

| | | | |
|---|---|---|---|
| 863,274 | 8/1907 | Haffey | 248/98 |
| 3,052,484 | 9/1962 | Huffman et al. | 280/47.19 X |
| 3,603,542 | 9/1971 | Grille | 248/98 |
| 3,754,771 | 8/1973 | Shagoury | 248/98 X |
| 3,950,004 | 4/1976 | Olsson | 248/98 X |

Primary Examiner—John A. Pekar
Attorney, Agent, or Firm—George W. Finch

[57] ABSTRACT

A hand truck having in addition to the normal lower support platform and wheels, a structural loop for maintaining open trash bags in an erect and open condition on the platform. The loop is hingedly mounted to the hand truck about an axle for swinging upwardly and rearwardly so that it can be manually moved to a position where it does not obstruct the positioning of a conventional cylindrical trash container on the platform. The integral handle for the hand truck is formed to provide a stop for the rotation of the trash bag loop and the handle and the axle accommodate a clip-on tray which can be used to carry additional trash bags and small garden tools commonly used when collecting trash or pruning and trash bag clips.

4 Claims, 7 Drawing Figures

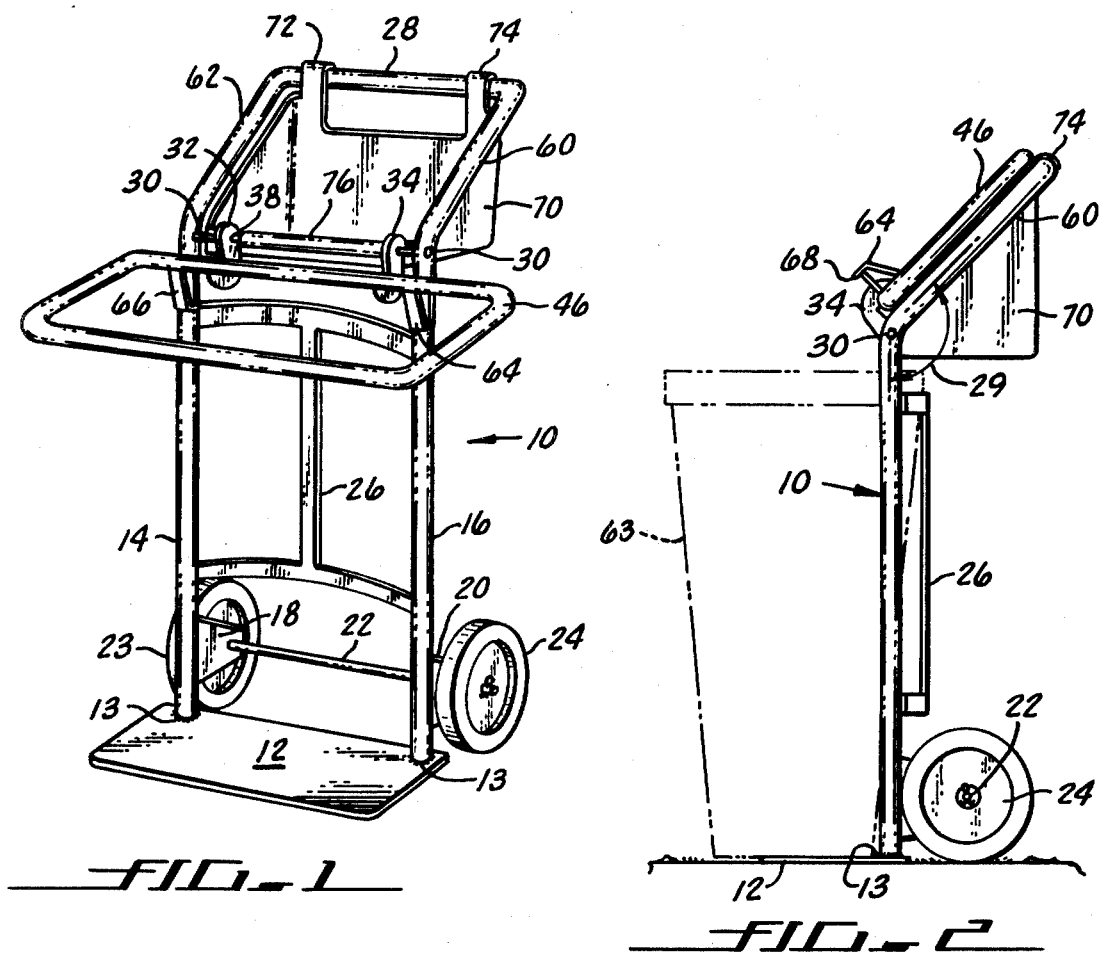
FIG_1
FIG_2
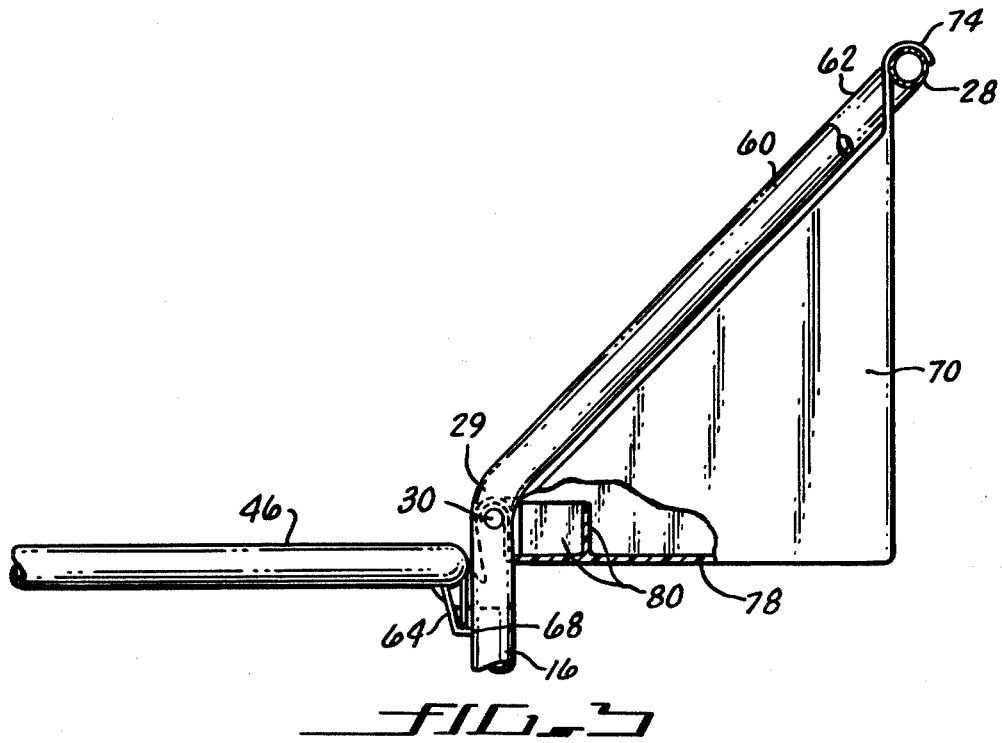
FIG_3

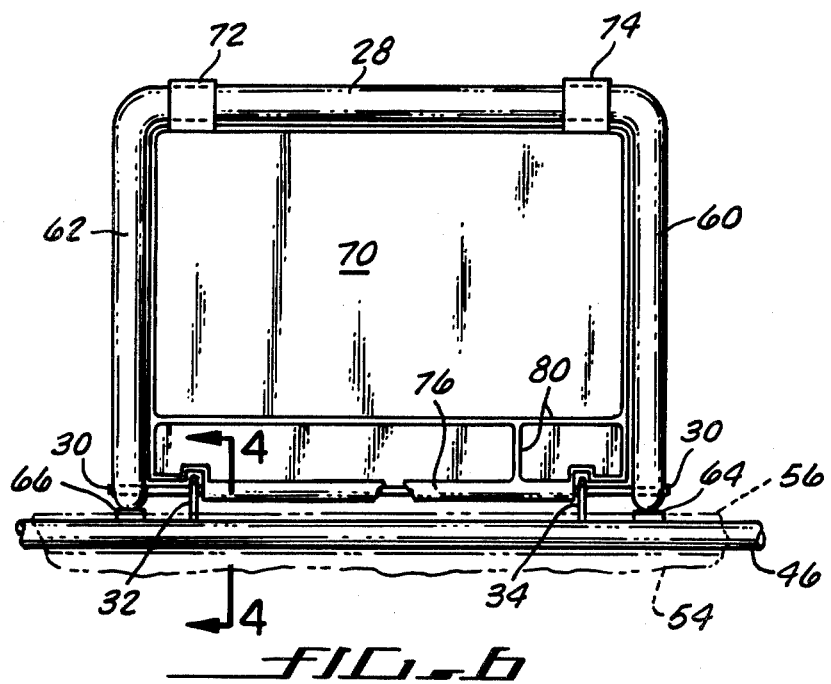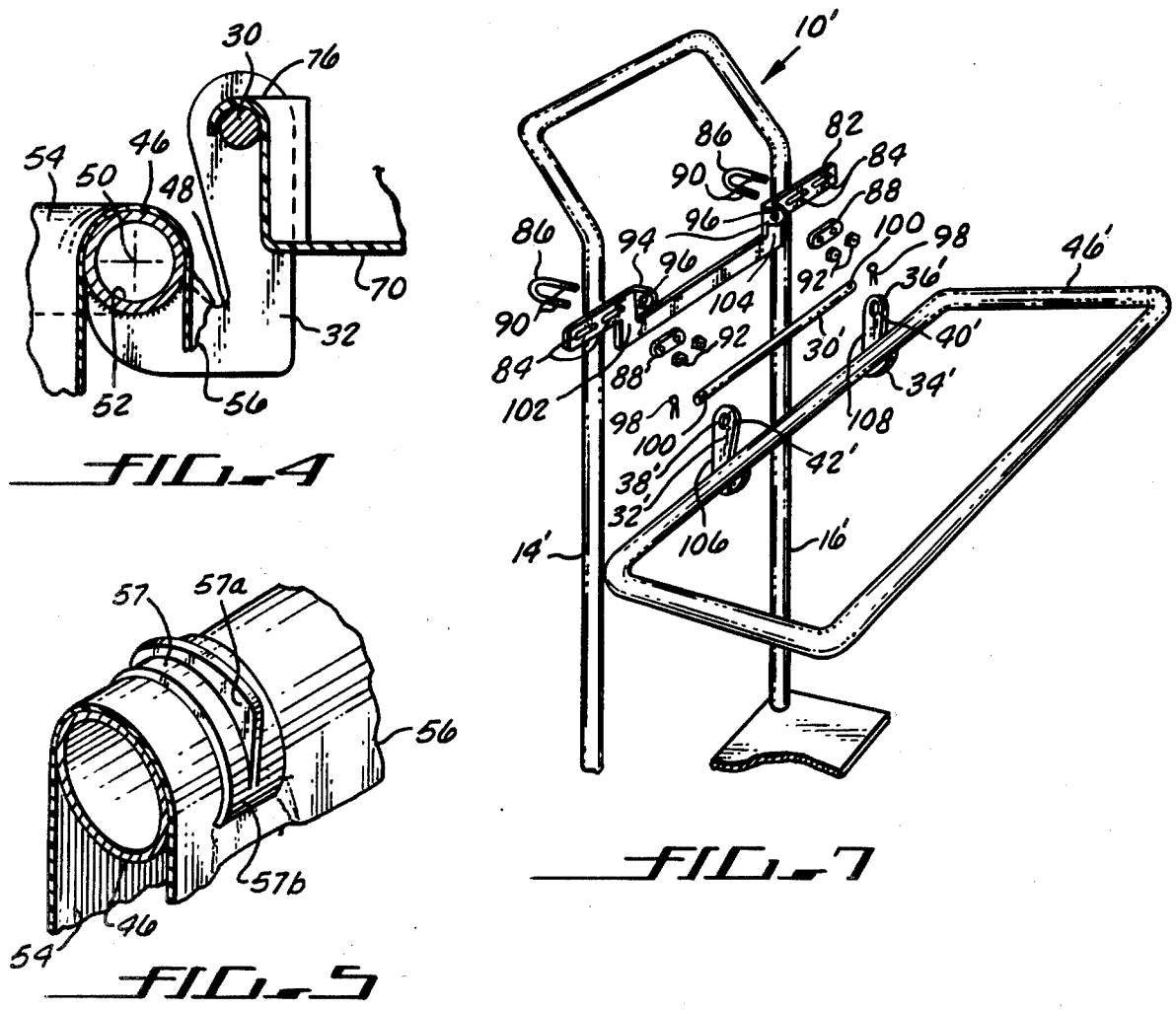

MULTI-PURPOSE HAND TRUCK

BACKGROUND OF THE INVENTION

Hand trucks of the conventional sort are well known in the prior art and are used to enable the easy movement of heavy or unwieldy loads which otherwise might strain the worker. Such hand trucks are commonly used to move trash and garbage cans whether they be of the metal or plastic variety. Recently, plastic trash bags have come on the market which are of a relatively flimsy and economical type. These bags are convenient due to their throw-away nature, yet inconvenient since their sides are insufficiently stiff to allow convenient trash packing therein by a single person. Their use has required one person to hold the bag open while another person inserts trash such as lawn clippings and pruned branches therein. Sometimes in such operations, hand tools such as pruning shears and edging clippers get mixed in with the trash and ultimately end up in the trash bag or trash can where they are lost. It is common also for such tools to fall on the ground where they are forgotten and soon rust. Therefore, there has been a need, especially for the home gardener, for a hand truck adaptable for both trash containers and trash bags which is convenient to use and which also includes a tool holder to assure that small hand tools are not lost. The solution to this need has been complicated by the necessity that such multi-purpose hand truck should have a reasonable cost and a long and useful life.

SUMMARY OF THE PRESENT INVENTION

The present invention solves the above stated and other needs by providing a hand truck whose strong lower platform can be used to support trash cans and trash containers while its integral handle is constructed so that a container tray can be snapped thereover for the retention of hand tools therein. In addition, the present hand truck includes a trash bag support ring or loop which is hingedly supported to the hand truck at a convenient height so that the edge of the trash bag adjacent its open end can be wrapped thereabout for support and yet the base of the trash bag rests on the support platform or the ground. The ring holds the trash bag open, erect and in a convenient position for the insertion of trash and although not entirely necessary, clips can be provided to assure the retention of the bag on its supporting ring. The clips, as well as extra trash bags can be stored in the aforementioned tool tray.

The hand truck itself can be manufactured easily from sheet bar and tube stock of conventional sizes and therefore is relatively economical to manufacture.

It is, therefore, an object of the present invention to provide a hand truck which may be used to transport trash containers and garbage cans, can be used to fill and transport plastic trash bags and includes a container for retaining spare trash bags, trash bag clips or small hand tools.

Another object of the present invention is to provide a multi-function hand truck suitable for residential garden and household use.

Another object is to provide a multi-purpose hand truck at a reasonable price.

Another object is to provide a multi-purpose hand truck which can be manufactured with relatively little equipment and tooling and yet is ruggedly constructed for a long life.

These and other objects of the present invention will become apparent to those skilled in the art after considering the following detailed specification which covers preferred embodiments thereof in conjunction with the accompanying drawings wherein:

BRIEF DESCRIPTION OF THE DRAWINGS

FIG. 1 is a perspective view of the hand truck of the present invention with its trash bag supporting ring in its operative position;

FIG. 2 is a side view of the hand truck of FIG. 1 with the trash bag supporting ring in its stowed position;

FIG. 3 is an enlarged, partially cross-sectional detail view of the handle and trash ring hinge portion of the hand truck of FIGS. 1 and 2;

FIG. 4 is an enlarged cross-sectional view taken at line 4—4 of FIG. 6.

FIG. 5 is an enlarged perspective view of a portion of the trash bag ring having a clip retaining the trash bag edge thereon;

FIG. 6 is an enlarged top, detail view of the handle and hinge portion of the hand truck of FIG. 1 with a trash bag installed thereon; and FIG. 7 is an exploded view of modified trash bag ring and hanger system which can be used on pre-existing hand trucks.

DETAILED DESCRIPTION OF THE PRESENT INVENTION

Referring to the drawings, more particularly by reference numbers, number 10 in FIG. 1 refers to a hand truck constructed according to the present invention. The hand truck 10 includes a base plate 12 which is used as a platform to support heavy loads such as garbage containers and trash cans as well as the base of trash bags. As can be seen, the base plate 12 has attached thereto, usually by welds 13, two upstanding tubular portions 14 and 16 which form the side frames of the hand truck. Closely adjacent the base plate 12, but extending rearwardly from the tubes 14 and 16 are two parallel axle supporting plates 18 and 20 through which an axle 22 is mounted to provide the support for two wheels 23 and 24. Optional cross-bracing such as the arcuate brace 26 can be provided to assist in maintaining the two upstanding tubular portions 14 and 16 in rigid positions. Heretofore, portions of a conventional hand truck have been described.

The two tubular portions 14 and 16 are preferably constructed from one piece of tubing which extends upwardly with the portions 14 and 16 in parallel and then is bent rearwardly to form interior bends 29 of about 155 degrees (FIGS. 2 and 3) and then at right angles to form a horizontal crossing handle 28 which is perpendicular to the tubular portions 14 and 16, but offset from the plane thereof. The angular rearward bends 29 locate the position of a rod 30 which extends from tubular portion 14 to portion 16 and which is connected thereto at that location. The rod 30 is used to stiffen the structure formed by the tubular portions 14 and 16 and to form the axle for a pair of hook-shaped hinge members 32 and 34 pivoted thereto. The rod 30 passes through holes 36 and 38 in the upper portion of the hook members 32 and 34, the inside surfaces 40 and 42 of the holes 36 and 38 forming the bearing surfaces for rotation of the hook-shaped members 32 and 34 with respect to the rod 30. The lower portions of the hook-shaped members 32 and 34 are fixedly attached, such as by welding to a trash bag ring 46 as shown in greater detail on FIG. 4.

The hooks 32 and 34 include a cutout portion 48 which extends below the center axis 50 of the cylindrical tubing 52 used to form the ring 46 so that when a trash bag 54 is installed thereon, the upper-edge lip 56 of the bag 54 can be wrapped at least a 180 degrees therearound. Clips 57, as shown in FIG. 5 can be used over the bag 54 and the ring 46 to assure retention of the bag 54. The clips 57 can be cylindrical in shape having more than a 180 degree circumference. A intregal stiffening rib 57a can be molded as part of the clip 57 extending radially outwardly from the exterior surface 57b thereof to strengthen the clip 57. As shown in FIG. 2 the hook-shaped members 32 and 34 and their bearing surfaces 40 and 42 enable the trash bag ring 46 to be rotated up into contact with the angled portions 60 and 62 of the hand truck frame so that a trash container 63 shown in dashed outline in FIG. 2 can be conveniently loaded onto the base plate 12. For this reason the width of the preferably rectangular ring 46 must be equal or less than the length of the portions 60 and 62 so that sufficient contact is made with a suitable movement arm to prevent overstressing of the rod 30.

When the trash bag ring 46 is swung downwardly (counter clockwise in FIG. 2) it is restrained in a horizontal plane by a pair of stops 64 and 66 which are rigidly mounted to the then underside of the ring 46 by suitable means such as welding. The stops 64 and 66 include abutment surfaces 68 which engage the tubular portions 14 and 16 when the ring 46 is parallel to the base plate 12 and may be concave to better distribute the load to the portions 14 and 16.

The handle 28 and the rod 30 which are parallel to each other but offset laterally, form support means for a clip-on tray 70. The tray has spaced upper hook portions 72 and 74 which engage the handle 28 and a lower hook portion 76 which engages the rod 30 between the two hook members 32 and 34. This is shown in greater detail in FIG. 3. The vertical orientation of the hook members 72, 74 and 76 in relation to the base 78 of the tray 70 is chosen so that the base 78 is approximately parallel to the base plate 12. This assures that garden tools, trash bags 54 and trash bag retaining clips 57, can be retained therein. If desired the base 78 can be containerized by upstanding partitions 80. Since the hook portion 76 of the tray 70 is between the two hook portions 32 and 34, the tray 70 does not impede the rotation of the trash bag retaining ring 46.

A trash bag ring 46' similar to ring 46 can also be provided for use on pre-existing hand trucks through the use of the adapter member 82, shown in FIG. 7. The adapter member 82 includes longitudinal slots 84 through which U-bolts 86 can be inserted after being placed around the normal tubular upstanding portions 14' and 16' of a conventional hand truck 10'. Retainers 88 are then placed over the ends 90 of the U-bolts 86 to prevent the ends 90 from spreading and the nuts 92 are threadably engaged with the ends 90 of the U-bolts 86 and tightened to complete the attachment of the adapter member 82 to the hand truck 10'. The adapter member 82 also includes at least two sidewardly extending tabs 94 which have axially aligned holes 96 which extend therethrough. A rod 30 similar to rod 30 is inserted through the holes 96 in the tabs 94 and the holes 36' and 38' on the trash bag ring connected hook members 32' and 34' so that the trash bag retaining ring 46' is hingedly mounted to the adapter 82 by the bearing surfaces 40' and 42'. Suitable retention means such as cotter pins 98 which extend through holes 100 in the rod 30' are used to retain the rod 30' in the holes 36', 38' and 96.

Since the location of the uprights of the hand truck 10' may vary, the adapter member 82 provides abutment areas 102 and 104 which are positioned to engage the back surfaces 106 and 108 of the members 32' and 34' to provide the stops for the ring 46' when it is rotated to its generally horizontal position.

Thus, there has been shown and described a novel multi-purpose hand truck or addition thereto which fulfills all the objects and advantages sought therefor. Many changes, alterations, modifications and other uses and applications of the subject multi-purpose hand truck will become apparent to those skilled in the art after considering this specification and the accompanying drawings. All changes, modifications, variations and other uses and applications which do not depart from the spirit and scope of the invention are deemed to be covered by the invention which is limited only by the claims which follow:

What is claimed is:

1. A hand truck having a load platform, a pair of side support members extending upwardly from the load platform and a handle connected to the side support members, the improvement comprising:

a trash bag ring; and means to pivotally support said trash bag ring in first and second predetermined positions, said first position being substantially parallel to, above and spaced from the load platform and said second position being rotated more than 90° upwardly therefrom, the support members each including upper portions which are slanted away from said trash bag ring when said trash bag ring is in its first position, said upper portions each forming an angle of less than 90° to its associated support member, said handle being connected to said upper portions, said second position of said trash bag ring placing said ring in contact with at least one of said upper portions of said support members, said means to pivotally support said trash bag ring including, an axle connected between said support members and a pair of attachment members pivotally connected to said axle and fixedly connected to said trash bag ring, said trash bag ring being formed from material which has a generally circular cross-section so that said ring also has a circular cross-section and upper and lower semi-circular surfaces wherein said attachment members are hook-shaped members, when in its first position said hook-shaped member pivots to said axle above said trash bag ring and is fixedly connected to said lower semi-circular surface thereof, and said hand truck further including at least one stop member extending downwardly from said ring when said ring is in said first position, said stop member including a sidewardly facing abutment surface which engages one of said support members when said trash bag ring is in said first position.

2. The hand truck defined in claim 1 wherein said axle and said handle being in parallel spaced relationship with said handle above said axle, said hand truck including a container having at least one upper hook for engagement and connection to said handle and at least one lower hook for engagement and connection to said axle; said hand truck also including a plurality of circular clips having an inner circumference of more than 180° and sized to retain a trash bag on said trash bag ring.

3. Means for holding a trash bag in a useable open condition on the load platform of a hand truck which has in addition to the load platform, a pair of side support members extending generally upwardly from the load platform and a handle operatively connected to the side support members, said means including:

a trash bag ring; and means to pivotally support said trash bag ring to the hand truck in first and second predetermined positions, said first position being substantially parallel to, above and spaced from the load platform and said second position of said trash bag ring being more than 90° rotated upwardly from said first position thereof, said means for pivotally supporting said trash bag ring including:

at least one axle;

means fixedly connected to said trash bag ring and pivotally connected to said axle;

means connecting said axle to the hand truck, said means fixedly connected to said trash bag ring and pivotally connected to said axle including a pair of hook-shaped members having an upper end pivotally connected to said axle, a lower end connected to said trash bag ring and a back abutment surface which forms a portion of a stop to maintain said trash bag ring in its first position, said trash bag ring being rectangular in shape and having an upper semi-circular surface and a lower surface, said upper semi-circular surface engaging the trash bag and said lower semi-circular surface being connected to said pair of hook-shaped members so the trash bag can be folded over said trash bag ring at least 180°.

4. The means defined in claim 3 wherein said means connecting said axle to the hand truck include:

an adapter member having abutment surfaces which engage said back abutment surfaces of said hook-shaped members to form another portion of the stop, and tangs positioned at right angles to said axle and having internal bearing surfaces for pivotal support of said axle which is supported therein; and a pair of U-shaped clamps for connecting said adapter member to the side support members of the hand truck.

* * * * *